United States Patent [19]

Heathman et al.

[11] Patent Number: 5,346,012

[45] Date of Patent: Sep. 13, 1994

[54] FINE PARTICLE SIZE CEMENT COMPOSITIONS AND METHODS

[75] Inventors: James F. Heathman; Ronald J. Crook, both of Duncan, Okla.

[73] Assignee: Halliburton Company, Duncan, Okla.

[21] Appl. No.: 12,091

[22] Filed: Feb. 1, 1993

[51] Int. Cl.⁵ .............................. E21B 33/13
[52] U.S. Cl. .................... 166/293; 166/292; 106/727; 106/730; 106/737; 106/DIG. 1
[58] Field of Search ............... 166/292, 293; 106/724, 106/727, 730, 737, DIG. 1

[56] References Cited

U.S. PATENT DOCUMENTS

| | | | |
|---|---|---|---|
| 3,876,005 | 4/1975 | Fincher et al. | 166/292 |
| 4,256,500 | 3/1981 | Turpin, Jr. | 106/709 X |
| 4,557,763 | 12/1985 | George et al. | 166/293 X |
| 4,565,578 | 1/1986 | Sutton et al. | 166/293 X |
| 4,676,832 | 6/1987 | Childs et al. | 166/293 X |
| 4,967,839 | 11/1990 | Carpenter et al. | 166/292 X |
| 5,106,423 | 4/1992 | Clarke | 166/293 X |
| 5,121,795 | 6/1992 | Ewert et al. | 166/292 |
| 5,125,455 | 6/1992 | Harris et al. | 166/292 |
| 5,211,234 | 5/1993 | Floyd | 166/292 X |

*Primary Examiner*—George A. Suchfield
*Attorney, Agent, or Firm*—Robert A. Kent; Thomas R. Weaver; Clifford C. Dougherty, III

[57] ABSTRACT

Fine particle size cement compositions and methods of using such compositions for cementing in a subterranean zone penetrated by a well bore are provided. The compositions are basically comprised of a fine particle size hydraulic cement, a fine particle size pozzolanic material and sufficient water to form a pumpable slurry.

15 Claims, No Drawings

FINE PARTICLE SIZE CEMENT COMPOSITIONS AND METHODS

BACKGROUND OF THE INVENTION

1. Field of the Invention

The present invention relates generally to cement compositions utilized in the construction and repair of wells, and more particularly, to such cement compositions which have fine particle size and methods of their use.

2. Description of the Prior Arts

In cementing operations such as those carried out in constructing and repairing oil, gas and water wells, a hydraulic cement composition is prepared by mixing a hydraulic cement with water and other additives, the composition is placed into a subterranean zone to be cemented and allowed to set into a hard substantially impermeable mass therein.

After a well has been constructed and used in the recovery of fluids from or the introduction of fluids into subterranean formations, problems relating to the unwanted passage of fluids into or from subterranean formations or the well bore penetrating such formations sometimes occur. This unwanted passage of fluids can severely disrupt or terminate the operation of a well.

The unwanted passage of fluids referred to above ordinarily involves the flow of oil, gas or water through small openings such as holes or cracks in well casing; holes, cracks, voids or channels in the cement sheath in the annular space between the walls of the well bore and the well casing; very small spaces between the cement sheath and the exterior surface of the casing or the walls of the well bore; and permeable spaces in gravel packs and formations.

Heretofore, such openings have been plugged or attempted to be plugged using hydraulic cement compositions. However, when the openings are very small, it is difficult to cause a cement composition of relatively large particle size to enter the openings and set therein whereby the openings are plugged. If the cement composition utilized can not enter the openings, at best a bridge or patch may be formed over the openings to produce only a temporary termination of the unwanted fluid flow.

In primary cementing, i.e., the forming of the above mentioned cement sheath in the annular space between pipe disposed in a well bore and the walls of the well bore, a pumpable hydraulic cement composition is introduced into the annular space and the cement composition is permitted to set therein. The cement sheath provides physical support and positioning to the pipe in the well bore and prevents unwanted fluid migration between subterranean zones and formations penetrated by the well bore. If the hardened cement sheath between the pipe and walls of the well bore contains spaces such as voids, cracks or channels, the unwanted fluid migration between zones and formations can still take place. Other problems incidental to primary cementing involve the failure of the cement sheath to tightly bond to the exterior walls of the pipe or the interior of the well bore, the formation of fractures in or the breakdown of subterranean formations due to the hydrostatic pressure developed by the cement composition and other similar problems. As mentioned above, the conventional solution to repairing faulty primary cementing has been to force a cement composition into the voids, cracks or channels formed and to permit the cement to set therein whereby the voids, cracks or channels are sealed. However, when the voids, cracks and channels are very small, it is often difficult to squeeze conventional cement compositions thereinto.

Recently, fine particle size hydraulic cement compositions have been used in the construction and repair of wells. Such fine particle size hydraulic cement compositions and methods of their use are described in detail, for example, in U.S. Pat. Nos. 5,086,850 entitled Squeeze Cementing issued Jun. 16, 1992 and No. 5,125,455 entitled Primary Cementing issued on Jun. 30, 1992. The fine particle size cement compositions and methods have been utilized successfully in primary cementing, squeeze cementing and other forms of well cementing. Because of the fine particle size of the cement, the compositions can readily be forced into and through very small openings, they can have low densities and they quickly develop gel strength after placement. However, problems which have persisted in the use of such fine particle size cement compositions is that they often tend to prematurely gel, have poor compressive strength development and suffer from subsequent loss of compressive strength, a condition known in the art as compressive strength retrogression.

Thus, there remains a need for fine particle size cement compositions and methods wherein the compositions do not prematurely gel and have good compressive strength development without the occurrence of subsequent compressive strength retrogression.

SUMMARY OF THE INVENTION

By the present invention, fine particle size cement compositions and methods are provided which meet the needs recited above and overcome the shortcomings of the prior art. The fine particle size compositions are basically comprised of a fine particle size hydraulic cement wherein the particles are of a size no greater than about 30 microns and have a Blaine Fineness of no less than about 6000 square centimeters per gram, a fine particle size pozzolanic material wherein the particles are of a size no greater than about 30 microns and have a Blaine Fineness no less than about 5,000 square centimeters per gram present in the composition in an amount in the range of from about 20% to about 90% by weight of cement therein and sufficient water to form a pumpable slurry.

The compositions also preferably include a dispersing agent comprised of the condensation polymer product of formaldehyde, acetone and sodium sulfite, and the compositions can also include a fluid loss control agent, a set retarding additive and fine particle size sand.

The methods of the invention for cementing in a subterranean zone penetrated by a well bore are basically comprised of the steps of pumping a fine particle size cement composition of the type described above into the subterranean zone and allowing the cement composition to set into a hard substantially impermeable mass therein.

It is, therefore, a general object of the present invention to provide improved fine particle size cement compositions and methods of their use.

Other objects, features and advantages of the present invention will be readily apparent to those skilled in the art upon a reading of the description of preferred embodiments which follows.

DESCRIPTION OF PREFERRED EMBODIMENTS

The improved fine particle size cement compositions of this invention do not suffer from premature gelation problems and have good compressive strengths after setting without the occurrence of substantial compressive strength retrogression. As will be understood by those skilled in the art, when a cement composition prematurely gels prior to being placed, the composition can become unpumpable and can set in undesirable locations such as in the well bore, in conduits disposed in the well bore or in surface pipe and equipment. Once placed, if a cement composition does not develop adequate compressive strength or suffers substantial compressive strength retrogression, it can fail in its intended purpose such as in plugging cracks, voids or channels, bonding pipe to the walls of a well bore or the like.

The cement compositions of this invention are basically comprised of a fine particle size hydraulic cement, a fine particle size extender comprised of a pozzolanic material and sufficient water to form a pumpable slurry. The presence of the fine particle size pozzolanic material extender reduces the overall cost of the composition, prevents premature gelation problems and reacts in the composition to improve compressive strength and substantially prevent compressive strength retrogression.

The Fine Particle Size Cement

The fine particle hydraulic cement suitable for use in accordance with the present invention is comprised of particles of cementitious material having diameters no larger than about 30 microns, preferably no larger than about 17 microns and still more preferably no larger than about 11 microns. The distribution of various sized particles within the cementitious material is preferably such that 90 percent of the particles have a diameter no greater than about 25 microns, more preferably about 10 microns and still more preferably about 7 microns, 50 percent of the particles have a diameter no greater than about 10 microns, more preferably about 6 microns and still more preferably about 4 microns and 20 percent of the particles have a diameter no greater than about 5 microns, more preferably about 3 microns and still more preferably about 2 microns.

The particle size of the hydraulic cement can also be expressed in terms of the specific area per unit weight of a given sample of material. This value, also referred to as Blaine Fineness, can be expressed in units of square centimeters per gram ($cm^2/gram$), and is an indication of the ability of a material to chemically interact with other materials. Another commonly used method of reporting particle size is referred to as specific surface area and is expressed in units of square meters per cubic centimeter ($m^2/cc$).

The Blaine Fineness of the fine particle size hydraulic cement used in accordance with this invention is preferably no less than about 6000 $cm^2/gram$. More preferably, the Blaine Fineness of the cement is no less than about 7000, still more preferably no less than about 10,000, and even more preferably no less than about 13,000 $cm^2/gram$.

Cementitious materials of particle size and fineness as set out above are disclosed in various prior U.S. Patents including U.S. Pat. No. 4,761,183 to Clark, which is drawn to slag and mixtures thereof with Portland cement and U.S. Pat. No. 4,160,674 to Sawyer, which is drawn to Portland cement. The cementitious materials preferred for use in this invention are Portland cement and combinations thereof with slag wherein the quantity of Portland cement included in any mixture of Portland cement and slag used can be as low as 10 percent, but is preferably no less than about 40 percent and more preferably about 80 percent by weight of the mixture. Most preferably, the fine particle size cement is 100% Portland cement.

The tables which follow provide information and data concerning the chemical, physical and performance properties of four hydraulic cements. Three of the cements are Portland cements and the fourth is a slag cement. One of the Portland cements, identified as API Class A, due to particle size only, is not within the scope of this invention and is included for comparison purposes. The other three cements are within the scope of this invention.

Tables I and II provide physical data including specific surface, specific gravity, blending and particle size analysis.

Tables III and IV provide performance data including compressive strength developed by stated slurries and penetration by stated slurries.

Tables V, VI, VIII and VIII provide chemical content as determined by various different analysis techniques.

Table IX provides a chemical analysis of Portland type III cement as disclosed in U.S. Pat. No. 4,160,674 to Sawyer.

TABLE I

Comparison of Cements

| Hydraulic Cement Name | Type | Specific Surface Blaine, $cm^2/g$ | Specific Gravity g/cc | Slag Content Weight % |
|---|---|---|---|---|
| Ultra Fine | Portland | 13080 | 3.03 | 0 |
| API Class A | Portland | 3900 | 3.15 | 0 |
| White | Portland | 6460 | 3.03 | 0 |
| MC-500 | SLAG/Portland | 8960 | 2.95 | 80 to 90 |

TABLE II

Comparison of Cements

Particle Size Analysis*
Percent Passing Opening Microns

| Hydraulic Cement Name | Type | Maximum Microns | 45.0 | 40.4 | 20.4 | 17.8 | 17.0 | 15.0 | 9.6 | 9.2 | 7.8 | 6.4 | 5.3 | 5.2 | 4.5 | 3.5 | 3.0 | 2.8 | 2.2 | 1.2 |
|---|---|---|---|---|---|---|---|---|---|---|---|---|---|---|---|---|---|---|---|---|
| Ultra Fine | Portland | 11 | — | — | — | — | — | 100 | — | — | — | 90 | 79.1 | — | — | 50 | 33.4 | — | 20 | 6.7 |
| API Class A | Portland | 90 | 95 | 90 | — | 50 | — | 42.7 | — | — | 20 | — | 12.0 | — | — | — | 2.8 | — | — | 0.3 |
| White | Portland | 27 | — | 100 | 90 | — | — | 74 | — | 50 | — | — | 27 | — | 20 | — | 8.9 | — | — | 1.8 |
| MC-500 | SLAG/ | 17 | — | — | — | — | 100 | — | 90 | — | — | — | 56.5 | 50 | — | — | 22.3 | 20 | — | 5.4 |

TABLE II-continued

Comparison of Cements

| Hydraulic Cement Name | Type | Maximum Microns | Particle Size Analysis* Percent Passing Opening Microns | | | | | | | | | | | | | | | |
|---|---|---|---|---|---|---|---|---|---|---|---|---|---|---|---|---|---|---|
| | | | 45.0 | 40.4 | 20.4 | 17.8 | 17.0 | 15.0 | 9.6 | 9.2 | 7.8 | 6.4 | 5.3 | 5.2 | 4.5 | 3.5 | 3.0 | 2.8 | 2.2 | 1.2 |
| | Portland | | | | | | | | | | | | | | | | | | | |

*Malvern 3600 Ec Particle Size Analyzer

TABLE III

Comparison of Properties of Water Slurries of Hydraulic Cements

| Hydraulic Cement Name | Type | 1500 psi Compressive Strength After 24 hours Set @ 80° F. | | | 250[5] psi Compressive Strength After 24 hours Set @ 80° F. | | |
|---|---|---|---|---|---|---|---|
| | | lb Cement | lb Water | Density, lb/gal | lb Cement | lb Water | Density, lb/gal |
| Ultra Fine | Portland | 1.00 | 1.00 | 12.5 | 1.00 | 1.4 | 11.5 |
| API Class A | Portland | 1.00[1] | 0.576 | 14.7 | 1.00[4] | 0.99 | 12.3 |
| White | Portland | 1.00[2] | 0.80 | 13.2 | 1.00 | 1.17 | 12.0 |
| MC-500 | SLAG/Portland | —[3] | —[3] | —[3] | 1.00 | 1.00 | 12.5 |

Notes:
[1] 0.02 lb Bentonite, 0.01 lb Calcium Chloride.
[2] 0.01 lb CFR-3 Dispersant.
[3] For practical commercial usages a slurry of sufficient high density cannot be made to produce the indicated compressive strength.
[4] 0.39 lb Amorphous Silica, 0.39 lb Pozmix, 0.01 lb Calcium Chloride.
[5] The Texas Railroad Commission requirement for primary cementing of surface casing.

TABLE IV

Comparison of Properties of Water Slurries of Hydraulic Cements

| Hydraulic Cement Name | Type | Penetration of Slurry Through* A 2 Inch Long, 0.003 Inch Wide Slot Under Pressure of 90 psi | | | Cement lb | Water lb | Slurry[2] Density lb/gal | Strength, 24 Hours psi |
|---|---|---|---|---|---|---|---|---|
| | | Volume, cc | Time, Sec | Percent of Slurry | | | | |
| Ultra Fine | Portland | 10 | 2 | 7.1 | 1.00 | 1.41 | 11.5 | 250 |
| API Class A | Portland | 0.7 | 2 | 0.5 | 1.00 | 0.461 | 15.6[3] | 1900 |
| White | Portland | 3 | 2 | 2.2 | 1.00[1] | 1.00 | 12.5 | 750 |
| MC-500 | SLAG/Portland | 8.6 | 2 | 6.1 | 1.00 | 1.00 | 12.5 | 250 |
| Ultra Fine | Portland | — | — | — | 1.00 | 0.80 | 13.2 | 2480 |

Notes:
[1] 0.01 lb CFR-3 Dispersant.
[2] The selected densities are considered to be commercial standards based on water required to avoid excessive settling of solids - i.e., water separation. Water requirements are a function of cement fineness.
[3] Density of 12.5 is not commercially practical due to excessive settling.
*Note:
Penetration tests were conducted by pouring 140 ccs of slurry into a cell containing a hardened steel plate on the bottom. A slot of 0.003 inches in width was placed across the entire 2 inch diameter of the plate. A pressure of 90 psi was applied to force the cement slurry through the slot. The percentages are by volume of the total slurry placed in the cell. For example, since 140 ccs of the Capitol Ultra Fine was placed in the cell, 7.1%, or 10 ccs, passed through the slot before bridging off.

TABLE V

X-Ray Fluorescence Analysis of Hydraulic Cement Material

| Oxide Components | Hydraulic Cement Name Percent | | | |
|---|---|---|---|---|
| | MC-500 | Ultra Fine | API Class A | White |
| $Na_2O$ | 0.30 | 0.17 | 0.37 | 0.37 |
| MgO | 3.40 | 1.10 | 1.30 | 2.40 |
| $Al_2O_3$ | 11.29 | 4.26 | 4.32 | 4.01 |
| $SiO_2$ | 29.54 | 17.80 | 20.86 | 21.08 |
| $SO_3$ | 2.15 | 7.85 | 2.98 | 3.40 |
| $K_2O$ | 0.41 | 0.95 | 0.93 | 0.27 |
| CaO | 50.79 | 62.12 | 65.29 | 65.64 |
| $TiO_2$ | 0.49 | 0.18 | 0.23 | 0.12 |
| $Cr_2O_3$ | 0.0 | 0.0 | 0.0 | 0.0 |
| MnO | 0.38 | 0.03 | 0.03 | 0.02 |
| $Fe_2O_3$ | 1.16 | 2.30 | 2.35 | 0.29 |
| ZnO | 0.01 | 0.01 | 0.02 | 0.01 |
| SrO | 0.08 | 0.11 | 0.07 | 0.04 |
| Loss On Ignition | 0.0 | 3.12 | 1.25 | 2.35 |

TABLE VI

Cement Compound Concentration, Percent By Bogue Calculation From Oxide Components in Table V

| Compound | MC-500 | Ultra Fine | API Class A | White |
|---|---|---|---|---|
| Free Lime | 0.4 | 0.7 | 0.58 | 3.67 |
| $C_3S$ | * | 62.56 | 64.89 | 55.58 |
| $C_2S$ | * | 5.47 | 11.6 | 19.96 |
| $C_3A$ | * | 7.63 | 7.57 | 10.39 |
| $C_4AF$ | * | 7.22 | 7.23 | 0.89 |
| $CaSO_4$ (CS) | * | 13.78 | 5.12 | 5.92 |

*Cannot calculate due to excess of Al and Si.

TABLE VII

Quantitative X-Ray Diffraction Analysis Hydraulic Cement Materials

| Extract Component | Crystalline Compound | MC-500 % | Ultra Fine % | API Class A % | White % | |
|---|---|---|---|---|---|---|
| Silicates | | * | 74.0 | 79.9 | 81.7 | |
| | $C_3S$ | * | 41.5 | 52.0 | | 55.6 |
| | $C_2S$ | * | 32.5 | 27.9 | | 26.1 |
| Sulfates | | * | 10.6 | 4.6 | 4.8 | |
| | $CaSO_4.2H_2O$ | * | 4.7 | 0.4 | | 1.9 |
| | $CaSO_4.\frac{1}{2}H_2O$ | * | 2.5 | 1.6 | | 3.4 |
| | Syngenite | * | 3.4 | 2.6 | | — |
| Alumino Ferrites | | * | 15.4 | 15.5 | 13.5 | |
| | $C_3A^1$ | * | 7.7 | 4.6 | | 8.5 |
| | $C_3A^2$ | * | 1.1 | 2.8 | | 4.0 |
| | $C_4AF$ | * | 6.4 | 7.8 | | — |
| | Periclase | * | 0.1 | 0.2 | | 0.8 |
| | Dolomite | * | 0.1 | 0.1 | | — |
| | Quartz | * | — | — | | 0.2 |

*Compounds are primarily non-Crystalline and therefore cannot be examined quantitatively.
[1]Cubic Crystalline form.
[2]Orthorhombic Crystalline form.

TABLE VIII

Miscellaneous Information Hydraulic Cement Name

| Measurement | MC-500 % | Ultra Fine % | API Class A % | White % |
|---|---|---|---|---|
| Insoluble Residue | 0.24 | 0.09 | 0.16 | 0.41 |
| Total Alkali | 0.57 | 0.80 | 0.98 | 0.55 |
| Total $H_2O$ Sol. Alkali | 0.56 | 0.05 | 0.43 | 0.17 |
| Differential Thermal Analysis | | | | |
| Gypsum | 0.0 | 5.44 | 0.30 | 0.85 |
| Hemihydrate | 1.04 | 0.44 | 0.17 | 0.88 |

Referring now to Tables I, II, III, IV, V, VI, VII and VIII set out above, there is presented, in convenient tabular form, a comparison of various properties of four different cementitious materials each of which exhibit hydraulic activity. "Hydraulic activity" and "reactivity" as used herein mean the chemical nature of a material to set and harden, upon being mixed with water, without contact with the atmosphere (e.g., the ability to harden under water) due to the interaction of the constituents of the material rather than by evaporation of the water. The term "hydraulic cement" as used herein means all inorganic cementitious materials of known type which comprise compounds of calcium, aluminum, silicon, oxygen and/or sulfur which exhibit "hydraulic activity", that is, which set solid and harden in the presence of water. There are in existence inorganic cementitious materials other than those exemplified in Tables I-VIII which exhibit hydraulic activity, but this invention is preferably limited to the types included in Tables I-VIII.

Accordingly, Portland cement, one of the materials listed in the Tables is made by sintering (thermally treating) a ground mixture of raw materials one of which is usually composed mainly of calcium carbonate (as limestone) and another of which is usually composed mainly of aluminum silicates (as clay or shale) to obtain a mixture of lime, aluminum oxide, silicon dioxide and ferric oxide. During the sintering process chemical reactions occur which produce nodules, called clinkers, which are primarily composed of mixed calcium silicates ($C_2S$) and $C_3S$), calcium aluminates ($C_3A$) and calcium aluminoferrites ($C_4AF$) all of which compounds contribute to the hydraulic activity of Portland cement. See for example Braunauer, U.S. Pat. No. 3,689,294; Buchet, et al., U.S. Pat. No. 4,054,460; and Gartner, U.S Pat. No. 4,619,702. An example of a chemical analysis of Portland cement clinker is provided by Skvara, U.S. Pat. No. 4,551,176 as follows:

| Component | Weight Percent |
|---|---|
| $SiO_2$ | 20–21.9 |
| CaO | 62.2–67.3 |
| $Al_2O_3$ | 4.7–6.3 |
| $Fe_2O_3$ | 2.4–4.5 |
| MgO | 1.3–3.3 |
| $SO_3$ | 0.16–1.05 |
| $Na_2O + K_2O$ | 0.81–0.95 |

After sintering, the clinkers are ground together with additives, including for example a quantity of calcium sulfate dihydrate (gypsum) to control set time, to a Blaine Fineness of as high as 10,000 cm²/gram or more, but ordinarily the grinding is sufficient to produce a Blaine Fineness in the range of from about 2500 to 5000 cm²/gram with 3000 to 4500 cm²/gram being the usual Blaine Fineness range for Portland cement. See for example Gartner, U.S. Pat. No. 4,619,702; Miyoshi et al., U.S. Pat. No. 4,443,260; Buchet et al., U.S. Pat. No. 4,054,460; and Braunauer, U.S. Pat. No. 3,689,294.

Portland cements are classified by the American Society of Testing Materials (ASTM) into five major types identified by Roman Numerals I, II, III, IV and V and by the American Petroleum Institute into at least 9 categories identified by the letters A, B, C, D, E, F, G, H and J. The classifications are based on chemical composition and physical properties.

Sawyer in U.S. Pat. No. 4,169,674 specifically discloses a Type III Portland cement exhibiting high early compressive strength wherein: substantially all particles in the cement are of a size of about 20 microns and smaller; the Blaine Fineness is about 8990 cm²/gram; and the specific gravity is 3.00. Sawyer provides an analysis of the Type III material, which is referred to as the "fine product". The analysis is set out in Table IX below.

TABLE IX

| Chemical Analysis-Fine Product | | Compound Composition | |
|---|---|---|---|
| $SiO_2$ | 19.61 | $C_3S$ | 46.58 |
| $Al_2O_3$ | 4.93 | $C_2S$ | 21.20 |
| $Fe_2O_3$ | 2.50 | $C_3A$ | 8.83 |
| CaO | 61.26 | $C_4AF$ | 7.61 |

TABLE IX-continued

| | | | |
|---|---|---|---|
| MgO | 1.42 | $CaSO_4$ | 10.18 |
| $SO_3$ | 5.99 | | |
| Loss | 3.12 | | |
| Total | 98.83 | | |
| | Lime Factor | | 2.45 |
| | Silica Ratio | | 2.64 |
| | A/F | | 1.97 |
| | Insol Residue | | 0.53 |
| | Free CaO | | 1.26 |
| | $Na_2O$ | | 0.11 |
| | $K_2O$ | | 1.06 |
| | Total alk. | | 0.81 |

Galer, et al., in U.S. Pat. No. 4,350,533 provides abbreviations for chemical formulas of cement compounds in accordance with general practice in the cement industry as follows:

C represents calcium oxide (CaO)
A represents aluminum oxide ($Al_2O_3$)
F represents ferric oxide ($Fe_2O_3$)
M represents magnesium oxide (MgO)
S represents silicon dioxide ($SiO_2$)
K represents potassium oxide ($K_2O$)
N represents sodium oxide ($Na_2O$)
H represents water ($H_2O$)
S represents sulfur trioxide ($SO_3$)
C represents carbon dioxide ($CO_2$)

Accordingly, based upon the above abbreviations the chemical composition of the Type III Portland cement disclosed by Sawyer (Table IX above) is:

| | | |
|---|---|---|
| $C_3S$ | $3CaO\ SiO_2$ | 46.58 |
| $C_2S$ | $2CaO\ SiO_2$ | 21.10 |
| $C_3A$ | $3CaO\ Al_2O_3$ | 8.83 |
| $C_4AF$ | $4CaO\ Al_2O_3Fe_2O_3$ | 7.61 |
| CS | $CaSO_4$ | 10.18 |

Tables I–VIII also include a hydraulic cement material identified as "SLAG/Portland" which is a combination of Portland cement and slag.

"Slag", as used herein, means a granulated, blastfurnace, by-product formed in the production of cast iron and is broadly comprised of the oxidized impurities found in iron ore.

During the operation of a blast furnace to remove iron from iron ore a molten waste product is formed. By preventing this molten product from crystallizing, and thereby losing its energy of crystallization, a supercooled liquid or noncrystalline glassy material can be formed thus retaining the energy of crystallization. This non-crystalline, glassy material, which has also been described as a vitreous substance free from crystalline substances as determined by X-ray diffraction analysis, is said to be capable of exhibiting hydraulic activity upon being reduced in size by grinding from a particle size of 1 to 5 millimeters to a fine particle size in the range of from about 1 to about 100 microns. Many commentators, including Clarke in U.S. Pat. No. 4,761,183 and Forss in U.S. Pat. No. 4,306,912, state that the glass content of the material, in order to exhibit latent hydraulic activity, must be high and preferably above about 95 percent.

Crystallization of the molten blast-furnace waste product can be prevented and the super cooled liquid or glass can be formed by rapidly chilling the molten waste. This rapid chilling can be effected by spraying the molten waste with streams of water which operation causes rapid solidification and formation of a water slurry of small, glassy, sand-like particles. The slurry is then thermally dried to remove substantially all moisture to thereby produce a dry blend of coarse particles. This dry blend of particles, having a particle size in the range of 1 to 5 millimeters, is then ground to reduce particle size to values in the range of from 1 to about 100 microns and preferably less than about 325 mesh (45 microns) to produce the granulated, blast-furnace byproduct herein defined as "Slag". See, for example, Miyoshi et al., U.S. Pat. No. 4,443,260; Allemand et al., U.S. Pat. No. 3,809,665; Buchet et al., U.S. Pat. No. 4,054,460; Gee et al., U.S. Pat. No. 4,242,142; Clarke, U.S. Pat. No. 4,761,183; and Forss, U.S. Pat. No. 4,306,912.

Clarke '183 and Miyoshi et al., in U.S. Pat. No. 4,306,910 disclose the following analysis, said by them to be representative of the usual ranges of chemical content of slag.

| | Weight Percent | |
|---|---|---|
| Component | Clarke | Miyoshi |
| $SiO_2$ | 30–40 | 30–35 |
| $Al_2O_3$ | 8–18 | 13–18 |
| $Fe_2O_3$ | — | 0.5–1.0 |
| CaO | 35–50 | 38–45 |
| MgO | 0–15 | 3–6 |
| $SO_3$ | — | — |
| FeO | 0–1 | — |
| S | 0–2 | 0.5–1.0 |
| $Mn_2O_3$ | 0–2 | — |
| MnO | — | 0.5–1.5 |
| $TiO_2$ | 0 | 0.5–1.0 |

Clarke further states that the density of slag is considered to be 2.92 grams per cubic centimeter.

Another analysis of slag is provided by Yamaguchi et al., in U.S. Pat. No. 3,904,568 as follows:

| Component | Weight Percent |
|---|---|
| $SiO_2$ | 34.9 |
| $Al_2O_3 + Fe_2O_3$ | 16.8 |
| CaO | 41.1 |
| MgO | 5.5 |

Miyoshi et al., '910 states that the hydraulic activity of slag is low if the particle size of the slag is in the range of 1 to 5 millimeters and accordingly, suggest that the particle size of slag should be reduced by grinding to a value of at least about 5 microns or less; and still further state that the slag, by itself, even after grinding has no or very low hydraulic activity and thus requires activation or stimulation such as by the addition thereto of slaked lime (CaO $H_2O$). Other additives to stimulate or activate the hydraulic activity of Slag include sodium hydroxide, sodium sulfate sodium carbonate, sodium silicate, potassium sulfate and Portland cement. See for example Clarke, U.S. Pat. No. 4,761,183 and Clarke, U.S. Pat. No. 4,897,119.

According to Forss in U.S. Pat. No. 4,306,912 grinding slag to a high specific surface, e.g., in the range of from about 4000 to about 8000 $cm^2/gram$, can increase the hydraulic activity and hardening rate of the material. Forss also states that it is known that grinding cement clinker beyond a certain limit is not beneficial because additional fineness hardly improves the properties of hardening and strength. On the other hand Birchall et al., in U.S. Pat. No. 4,353,747 state that the strength of Portland cement can be improved by reducing the weight average mean particle size of Portland cement to a value of less than 20 microns.

The Fine Particle Size Pozzolanic Material

The fine particle size pozzolanic material suitable for use in accordance with the present invention is a siliceous or siliceous and aluminous material having a low calcium hydroxide content whereby it does not chemically react at ordinary temperatures in the presence of water to form a cementitious compound without the addition of calcium hydroxide thereto. Suitable pozzolanic materials can also be defined as materials which, though not cementitious in themselves, contain constituents which will combine with calcium hydroxide in the presence of water to form stable compounds possessing cementing properties. In a hydraulic cement composition, such a pozzolanic material combines chemically with calcium hydroxide released upon the hydration of the hydraulic cement thereby forming a stable secondary cementitious structure. The benefits resulting from the reaction of the liberated calcium hydroxide with the pozzolanic material are that premature gelation is prevented, higher set cement compressive strength is realized, less compressive strength retrogression takes place and other properties of the cement are improved.

The pozzolanic materials useful in accordance with this invention must also be of a fine particle size whereby the particles have diameters no larger than about 30 microns, preferably no larger than about 15 microns and still more preferably no larger than about 10 microns. The distribution of the various size particles within the pozzolanic material should be such that about 90 percent of them have diameters no greater than about 25 microns, preferably about 12 microns and still more preferably about 8 microns, 50 percent having diameters not greater than about 10 microns, preferably about 6 microns and still more preferably about 3 microns and 20 percent of the particles having diameters no greater than about 5 microns, preferably about 3 microns and still more preferably about 2 microns. The particle size of the pozzolanic material expressed in terms of Blaine Fineness should be no less than about 5,000 square centimeters per gram, preferably no less than about 7,000, and most preferably no less than about 12,000 square centimeters per gram. The particle size of the pozzolanic material expressed in terms of Specific Surface Area should be no less than about 2 square meters per cubic centimeter, preferably no less than about 2.7 square meters per cubic centimeter and most preferably no less than about 4 square meters per cubic centimeter.

A particularly suitable fine particle size pozzolanic material which is commercially available is fine particle size fly ash classified as an ASTM Class F fly ash having the approximate physical properties set forth in Table X below. Fly ash is an artificial pozzolan formed in the combustion products resulting from the burning of pulverized coal in steam generating plants and the like.

TABLE X

Physical Properties of Fine Particle Size Fly Ash

| Appearance: | Gray Powder |
| Specific Gravity[1]: | 2.54 |
| Average Bulk Density[2]: | 48 to 50 lbs/ft$^3$ |
| Absolute Volume Factor: | 0.047263 gal/lb |
| Average Particle Size: | 2.5 to 3.4 microns |

TABLE X-continued

Physical Properties of Fine Particle Size Fly Ash

| Maximum Particle Size: | 9.6 to 12 microns |
| Percent Under 7.0 microns: | 90% |
| Specific Surface Area: | 2.8 to 3.1 m$^2$/cc |
| Normal Water Requirement[3]: | 38% by weight |

[1] Specific gravity determination by Beckman air compression pycnometer.
[2] Apparent bulk density determination (ASTM C110 Part 15 & 16).
[3] API Specification for Materials and Testing for Well Cements, Fifth Edition, July 1, 1990, page 42, Appendix B, Section B1; "Determination of Normal and Minimal Water Content of Slurry".

The oxide analysis of a pilot sample and two production samples of the Class F fine particle size fly ash having the above physical properties is set forth in Table XI below.

TABLE XI

Oxide Analysis of Fine Particle Size Fly Ash

| Oxide | Pilot Sample | Production Sample #1 | Production Sample #2 |
| --- | --- | --- | --- |
| $Na_2O$[a] | 0.06 | 0.10 | 1.39 |
| $MgO$[a] | 0.13 | 1.07 | 2.05 |
| $Al_2O_3$ | 29.98 | 26.89 | 24.41 |
| $SiO_2$ | 54.39 | 52.90 | 52.69 |
| $SO_3$[b] | 1.09 | 1.43 | 0.90 |
| $K_2O$ | 3.04 | 1.13 | 1.18 |
| CaO | 1.21 | 9.24 | 8.42 |
| $TiO_2$ | 1.51 | 1.42 | 1.07 |
| MnO | 0.03 | 0.05 | 0.11 |
| $Fe_2O_3$ | 5.62 | 3.72 | 6.01 |
| SrO | 0.09 | 0.14 | 0.32 |
| BaO | 0.12 | 0.10 | 0.69 |
| Limiting Oxygen Index (LOI)[c] | 2.74 | 1.81 | 0.76 |
| % Moisture[d] | 0.23 | 0.29 | 0.13 |
| % Water Soluble Alkali (WSA)[e] | 0.14 | 0.103 | 0.137 |
| % Free Lime | 0 | 0 | 0 |
| % Borate[f] | 0.13 | 0.8 | 1.4 |

[a] Na and Mg analysis by atomic absorption.
[b] S analysis by sulfur analyzer.
[c] LOI by weight loss at 1000° C.
[d] % moisture by weight loss at 110° C.
[e] Water Soluble Alkali results by ICP.
[f] By absorbance.

The fine particle size pozzolanic material described above functions in the cement compositions of the present invention as a relatively low cost lightweight extender which when the cement composition sets, reacts to offset the often poor compressive strength development and/or compressive strength retrogression observed for fine particle cement slurries that do not include the pozzolanic material. As previously mentioned, the presence of the fine particle size pozzolanic material in the cement compositions of this invention also effectively controls and prevents gelation problems which are inherent in the use of prior art fine particle size cement compositions.

The fine particle size pozzolanic material is generally included in a cement composition of this invention in an amount in the range of from about 20% to about 90% by weight of fine particle size cement therein. When the pozzolanic material is the above described preferred fine particle size fly ash, it is preferably present in the cement composition in an amount in the range of from about 30% to about 80%, most preferably about 50% by weight of cement therein.

The Cement Compositions

A number of the problems solved by the use of hydraulic cement compositions of fine particle size in well cementing are attributable to the ability of the fine particles to pass through very narrow openings and penetrate low permeability formations, gravel packs and the like. To solve other problems, the cement compositions must exhibit sufficiently low densities to enable their use in situations requiring lightweight cements which nevertheless develop satisfactory compressive strengths. In this regard, the large surface area of the fine particle size cement and pozzolanic material in the cement compositions of this invention render them more reactive than cement compositions containing cementitious materials of larger particle size, and accordingly, greater quantities of water than usually employed in well cementing compositions can be employed to enable the formulation of cement compositions of low density and low viscosity without unsatisfactory loss in strength. Thus, the cement compositions of the present invention can be formulated utilizing ratios of the weight of water per unit weight of fine particle size cement and fine particle size pozzolanic material in the range of from about 0.7 to about 2.8, preferably from about 1.0 to about 1.6 and still more preferably from about 0.9 to about 1.3 pounds of water per pound of cement and pozzolanic material. Water to cement and pozzolanic material ratios in excess of about 4:1 can be formulated for highly specialized applications requiring cement compositions of very low density and low viscosity. The densities of the cement compositions of this invention which can be formulated are in the range of from about 10 to about 13, preferably from about 11 to about 12.5 pounds per gallon.

As previously mentioned, the cement compositions of this invention are very useful for penetrating, filling and hardening in very small holes, cracks and spaces such as are sometimes found in well casings, cement sheaths, gravel packs and subterranean formations in the vicinity of a well bore. In addition, the compositions can be utilized to terminate the unwanted flow of water through a zone in a gravel pack; to penetrate, plug and set in fine cracks in well pipe and in channels and microannulus spaces in and around the cement sheath; and in other similar cementing techniques in subterranean zones penetrated by well bores.

The cement compositions of this invention preferably include a dispersing agent to facilitate the dispersion of the fine particle size cement and pozzolanic material in water and to help prevent the formation of large agglomerated particles or lumping. While various dispersing agents can be used, a particularly suitable dispersing agent is a polymer prepared by the condensation of formaldehyde with acetone and sodium sulfite. The resulting polymer contains sodium sulfonate groups and is described in detail in U.S. Pat. No. 4,557,763 issued on Dec. 10, 1985 to George et al. When used, the dispersing agent is generally added to the water utilized to form the fine particle size cement composition whereby it is present in the composition in an amount up to about 3% by weight of hydraulic cement therein.

Another additive which is often included in the cement compositions of this invention is a fluid loss control additive. A variety of fluid loss control additives are available and can be used such as hydroxyethylcellulose, carboxymethylhydroxyethylcellulose, copolymers of N,N-dimethylacrylamide and 2-acrylamido-2-methyl propane sulfonic acid and copolymers of acrylamide and 2-acrylamido-2-methyl propane sulfonic acid. Of these, a copolymer of N,N-dimethylacrylamide and 2-acrylamido-2-methyl propane sulfonic acid is particularly preferred. When used, the fluid loss additive is combined with the cement compositions of the present invention in an amount up to about 3% by weight of hydraulic cement therein.

Another additive which is commonly utilized in the cement compositions of this invention is a set retarding additive. This is particularly true when the subterranean zone in which the cementing operation is carried out has a relatively high temperature, i.e., a temperature in the range of from about 140° F. to about 240° F. and higher. While various set retarding additives can be utilized, a set retarding additive comprised of a methylene phosphonic acid derivative is preferred. Particularly suitable methylene phosphonic acid derivative set retarders include aminotri(methylenephosphonic acid), diethylenetriaminepenta(methylenephosphonic acid), hexamethylenediaminetetra(methylenephosphonic acid) and 1-hydroxyethylidine-1,1-diphosphonic acid. Of these, aminotri(methylenephosphonic acid) is the most preferred. A set retarding additive is generally included in a cement composition of this invention in an amount up to about 2% by weight of hydraulic cement therein.

Other additives can be included in the cement compositions including a fine particle size sand filler wherein the particles are of a size no greater than about 25 microns. The presence of the sand filler in the cement composition functions to help prevent compressive strength retrogression.

Thus, a fine particle size cement composition of this invention for cementing in a subterranean zone penetrated by a well bore is comprised of a fine particle size hydraulic cement wherein the particles are of a size no greater than about 30 microns and have a Blaine Fineness no less than about 6,000 square centimeters per gram, a fine particle size pozzolanic material which in the presence of water combines with calcium hydroxide released by the hydration of the hydraulic cement and wherein the particles of the pozzolanic material are of a size no greater than about 30 microns and have a Blaine Fineness no less than about 5,000 square centimeters per gram present in the composition in an amount in the range of from about 20% to about 90% by weight of cement therein and sufficient water to form a pumpable slurry. As mentioned, the compositions can also include a dispersing agent, preferably a dispersing agent comprised of a condensation polymer of formaldehyde, acetone and sodium sulfite present in the composition in an amount up to about 3% by weight of cement therein. A fluid loss control additive can also be included in the composition such as the copolymer of N,N-dimethylacrylamide and 2-acrylamido-2-methylpropane sulfonic acid present in the composition in an amount up to about 3% by weight of cement therein and a methylene sulfonic acid derivative set retarding additive can also be present in the composition in an amount up to about 2% by weight of cement therein.

The various methods for conducting cementing operations normally associated with wells in subterranean hydrocarbon producing formations are generally known. These basic procedures are set forth below and can be employed with changes, as required, to place the fine particle size cement composition of this invention in position to solve the various problems addressed herein.

Procedure I

Method for Placing Cement in a Microannulus

1. Determine the location, size and upper and lowermost linear limits of the microannulus relative to the axis of the well bore. This determination may be accomplished by use of a conventional cement bond log procedure.

2. Block Squeeze Technique a. Perforate the well casing so as to intersect the microannulus at its lowest point relative to the wellhead.
  b. Isolate the perforation by placing a bridge plug in the casing below the perforation and a packer in the casing above the perforation to thereby define a space within the casing between the bridge plug and packer which is in communication with the microannulus via the perforation; establish communication with the wellhead via tubing from the wellhead to the packer.
  c. Introduce an acid solution into the microannulus via tubing from the wellhead to the packer, the defined space and the perforation. The purpose of the acid, which can be a 15% hydrochloric acid solution, is to prepare the perforation and microannulus for cementing.
  d. Introduce water into the microannulus via the tubing and perforation to establish an injection rate.
  e. Introduce a cement composition of this invention into the microannulus. The composition must be of sufficient volume to form a plug in the entire lower portion of the microannulus to prevent passage of fluid therethrough. Introduction of the composition must be effected at a pressure less than the pressure required to fracture the formation.
  f. Remove excess cement composition from tubular goods and casing.
  g. Shut well in, preferably under pressure, to permit the cement to harden.
  h. Remove the tubing, the packer and the bridge plug from the well and perforate the well casing so as to intersect the microannulus at its uppermost point relative to the wellhead.
  i. Repeat steps "b" through "g" with respect to the perforation made in step "h~.

The block squeeze method described in steps 2a–2i thus produces water blocks at the extreme linear limits of a microannulus but does not completely fill the microannulus with cement.

The use of acid, as described in Step 2c, may be eliminated in the performance of the procedure when the cement of this invention is employed.

3. Rollover Technique a. Perforate the well casing in two locations, so as to intersect the microannulus at its uppermost point and its lowermost point relative to the wellhead.
  b. Isolate the zones below the perforated interval by placing a bridge plug in the casing below the perforation in the lowermost point of the microannulus.
  c. Place a drillable packer in the casing between the uppermost perforation and the lowermost perforation to thus establish a space within the casing between the bridge plug and drillable packer.
  d. Establish communication between the wellhead and the defined space via tubular goods from the wellhead to the packer.
  e. Establish communication between the perforations by introducing an acid solution into the microannulus via the tubing, the defined space and the lowermost perforation and permitting the solution to exit the microannulus via the uppermost perforation.
  f. Fill the microannulus with a cement composition of this invention by introducing the composition into the microannulus via the tubing, the defined space, and the lowermost perforation and maintaining such introduction until the composition exits the microannulus via the uppermost perforation.
  g. Remove excess cement composition from the defined space by backwashing.
  h. Shut well in, preferably under pressure, to permit the cement to harden.
  i. Drill set cement above drillable packer and drill through packer and remove bridge plug.

The rollover squeeze method described in steps 3a–3i results in a microannulus completely filled with the cement composition of this invention.

The use of acid, as described in Step 3e, may be eliminated in the performance of the procedure when the cement of this invention is employed.

Procedure II

Method for Placing Cement in Voids, Cracks and Channels in the Cement Sheath Utilize the procedure described in Procedure I for placing the cement composition of this invention in microannuli, however, as an additional step, a chemical flush preceding introduction of the cement slurry maybe employed. The purpose of the flush, which is not essential to the procedure, is to condition the hardened cement in the sheath for bonding. An example of a suitable such reactive chemical pre-flush is sodium silicate.

Procedure III

Method for Plugging Cracks and Perforations in Casing

1. Locate the casing hole by conventional means.

2. Isolate the hole by placing a bridge plug in the casing below the hole and a packer in the casing above the hole to thereby define a space within the casing between the bridge plug and packer; establish communication with the wellhead via tubing from the wellhead to the packer.

3. Introduce an acid solution into the hole via tubing from the wellhead to the packer and the defined space. The acid, which can be a 15% hydrochloric acid solution, will prepare the hole for cementing.

4. Introduce water into the hole via the tubing to establish an injection rate.

5. Introduce the cement composition of the invention into the hole via tubing from the wellhead to the packer and the defined space. The cement composition must be of sufficient volume to form a plug in the hole to prevent passage of fluid therethrough. Introduction of the cement composition must be effected at a pressure less than the pressure required to fracture the formation.

6. Remove excess cement composition from the defined space by backwashing.

7. Shut well in preferably under pressure to permit the cement to harden.

The use of acid as described in Step 3 may be eliminated in the performance of the procedure when the cement of this invention is employed.

Procedure IV

Alternate Method For Repair of Cracks in Casing

1. Locate crack in casing by conventional means.
2. Place a bridge plug in the casing below the crack to thereby isolate the crack from portions of the casing below the crack.
3. Introduce tubing into the casing from the wellhead to a location in the approximate vicinity of the crack.
4. Remove any debris from the portion of the casing above the bridge plug by introducing therein water via the tubing and circulating the same out the casing.
5. Introduce the cement composition of this invention via the tubing into the casing above the bridge plug in an amount sufficient to cover the crack.
6. Increase the pressure in the casing above the cement composition to force the composition to slowly penetrate into the crack and continue to increase casing pressure to assure such penetration.
7. Shut well in under pressure and do not release the pressure for a period of time, preferably about 24 hours, to permit the cement to harden in the crack.
8. Remove set cement from casing by drilling.
9. Pressure casing with water to determine whether repaired crack prevents loss of water.

Procedure V

Method For Terminating The Flow of Unwanted Fluids Such as Water or Gas Through a Gravel Pack and the Matrix of a Subterranean Formation 1. Place a volume of the cement composition of this invention within the slotted liner. The volume of cement composition placed should be in an amount at least sufficient to saturate the portion of the gravel pack through which the unwanted water is flowing. The cement composition may be spotted by permitting it to flow from the wellhead via tubing extended therefrom to the liner or by lowering it to the liner in a section of pipe having a valve in the bottom portion thereof and thereafter opening the valve and literally dumping the cement composition in the liner. The section of pipe and valve is referred to as a dump bailer.
2. Apply pressure against the cement composition in an amount sufficient to force the cement composition from the liner and into and through the gravel pack and at least partially into the portion of the formation from which undesirable water is being produced. The pressure applied to the cement composition should not be of sufficient intensity to make a fracture in the formation.
3. Maintain applied pressure for a time sufficient to permit the cement to harden before the well is returned to production.

Procedure VI

Method for Terminating the Flow of Unwanted Fluids Such as Water or Gas From a Zone in a Subterranean Formation 1. Locate the zone within the subterranean formation from which water is being produced. This task may be performed by using known methods of identifying casing perforations through which the unwanted fluid is flowing. The fluid may be flowing from a fracture or from a high permeability portion in the zone.
2. Isolate the identified perforations by placing a bridge plug in the casing, a bridge plug below the perforations, and a packer in the casing above the perforations to thereby define a space within the casing between the bridge plug and packer which is in communication with the zone via the perforations; establish communication with the wellhead via tubing from the wellhead to the packer.
3. Introduce a spacer fluid such as diesel oil into the zone via the tubing and perforations.
4. Introduce the cement composition of the invention less water in a hydrocarbon liquid into the zone. The cement composition less water must be of sufficient volume to form a plug in the zone to prevent passage of fluid therethrough when hydrated with formation water. Introduction of the cement composition in a hydrocarbon liquid is preferably effected at a pressure less than the pressure required to fracture the zone.
5. Introduce an overflush fluid such as diesel oil into the zone via the tubing and perforations to help in the introduction of the hydrocarbon-cement composition into the zone.
6. Shut well in for 24 hours, preferably under pressure, to permit the cement to hydrate with formation water in zone and harden. Remove the tubing, the packer and the bridge plug from the well.

Procedure VII

Method of Primary Cementing

The method of primary cementing using a cement composition of this invention encompasses cementing pipe including conductor pipe, surface casing, intermediate casing, production casing, drilling liner, production liner, scab liner and tieback casing.

1. Pump the cement composition or any preceding or following fluid down the pipe and back up the annular space between the pipe and the drilled hole.
2. (optional) Precede all fluids with a "bottom" wiper plug to clean drilling fluid from the pipe.
3. (optional) Pump a preflush chemical wash or "spacer" to serve as a drilling fluid removal agent and as a compatible spacer between the drilling fluid and the cement composition.
4. Pump the cement composition.
5. (optional) Follow the cement composition with a conventional cement composition.
6. Follow the cement slurry with a "top" wiper plug.
7. Pump a commonly used displacement fluid (water, drilling fluid, e.g.) to force the cement composition down the pipe and up into the annulus. Pump enough fluid to displace the required amount of casing volume. The "top" plug should land on a baffle or "float collar", closing off the flow of fluid to the annulus.
8. Pressure up to ensure that the top plug has landed.
9. Release pressure on casing to test if the "float" is holding to keep the cement in the annulus.
10. Terminate any operation in the well bore for a time sufficient to permit the cement composition to set (WOC).

As will be understood by those skilled in the art, a variety of other uses in the drilling, completion and production of wells not specifically mentioned herein can be made of the fine particle size cement compositions of this invention.

Thus, the methods of this invention for cementing in a subterranean zone penetrated by a well bore comprise the steps of pumping a fine particle size cement composition of this invention into the zone and then allowing the cement composition to set into a hard substantially impermeable mass in the zone. Depending upon the specific purpose of the cementing operation, one of the various procedures described above and the additional steps thereof may be used.

In order to further illustrate the compositions and methods of this invention, the following Examples are given.

EXAMPLE 1

A number of fine particle size cement compositions of the present invention were prepared and tested for thickening times and compressive strengths in accordance with API standard procedures. That is, the thickening time and compressive strength tests were conducted in accordance with the *API Specification for Materials and Testing for Well Cement*, API Spec. 10, published by the American Petroleum Institute, Washington, D.C. A first group of test slurries were prepared (Slurry Nos. 1–6) containing fine particle size Portland cement only wherein the particles of the cement were of a size no greater than about 30 microns and water in an amount of 6.5 to 10.75 gallons of water per 50 pounds of cement whereby the resulting slurries each had a density of 12.0 pounds per gallon. The slurries contained various quantities of a dispersing agent, a fluid loss control additive, a set retarding additive and fine particle size sand. Some of the slurries were tested for 7 day compresslye strengths at 220° F.

A number of additional test slurries, i.e., test cement compositions of the present invention, were prepared containing fine particle size Portland cement wherein the particles were of a size no greater than about 30 microns, fine particle size ASTM Class F fly ash wherein the particles were of a size no greater than about 30 microns and water (Slurry Nos. 7–24). These test cement compositions contained the fine particle size fly ash in equal amounts by weight to the amounts of hydraulic cement in the compositions and quantities of water were included to produce composition densities of 12.0 or 12.5 pounds per gallon. The test compositions contained various quantities of a dispersing agent, a fluid loss control additive, a set retarding additive and fine particle size sand, and were tested for thickening times in accordance with the above mentioned API specification. Some of the test cement compositions were also tested for 7 day compressive strengths at 220° F. The results of all of the tests described above are set forth in Table XII below.

TABLE XII

| Test Cement Composition No. | Density lb/gal | Water, % by weight of Fine Particle Size Cement or Cement and Fly Ash | Yield ft$^3$/sk | Fine Particle Size Sand[1] % by weight of Fine Particle Size Cement | Dispersing Agent[2], % by weight of Fine Particle Size Cement or Cement and Fly Ash | Fluid Loss Control Agent[3], % by weight of Fine Particle Size Cement or Cement and Fly Ash |
|---|---|---|---|---|---|---|
| 1 | 12.0 | 116.4 | 1.21 | — | — | 2.0 |
| 2 | 12.0 | 116.4 | 1.21 | — | 1.0 | — |
| 3 | 12.0 | 157.9 | 1.67 | 40 | 1.0 | — |
| 4 | 12.0 | 178.4 | 1.90 | 60 | — | 2.0 |
| 5 | 12.0 | 179.0 | 1.90 | 60 | — | 2.0 |
| 6[5] | 12.0 | 107.8 | 1.17 | — | — | 2.0 |
| 7 | 12.0 | 106.2 | 1.16 | — | — | 2.0 |
| 8 | 12.0 | 106.7 | 1.16 | — | — | 2.0 |
| 9 | 12.0 | 106.7 | 1.16 | — | 1.0 | — |
| 10 | 12.0 | 106.7 | 1.16 | — | 1.0 | — |
| 11 | 12.0 | 107.0 | 1.16 | — | 0.5 | — |
| 12 | 12.0 | 107.0 | 1.16 | — | 1.0 | — |
| 13 | 12.0 | 131.1 | 1.45 | 50 | 2.0 | — |
| 14 | 12.0 | 124.4 | 1.36 | 35 | 2.0 | — |
| 15 | 12.0 | 125.2 | 1.36 | 35 | 0.5 | — |
| 16 | 12.5 | 104.0 | 1.20 | 35 | 2.0 | — |
| 17 | 12.5 | 103.4 | 1.20 | 35 | 2.0 | — |
| 18 | 12.5 | 90.31 | 1.02 | — | — | 1.0 |
| 19 | 12.5 | 90.31 | 1.02 | — | — | 1.0 |
| 20 | 12.5 | 90.31 | 1.02 | — | — | 1.0 |
| 21 | 12.5 | 90.31 | 1.02 | — | 1.0 | — |
| 22 | 12.5 | 90.31 | 1.02 | — | 1.0 | — |
| 23 | 12.5 | 90.31 | 1.02 | — | 1.0 | — |
| 24[6] | 12.0 | 79.47 | 1.40 | 40 | 1.0 | — |

| Test Cement Composition No. | Set Retarding Additive[4], % by weight of Fine Particle Size Cement or Cement and Fly Ash | Thickening Time at Temp. (°F.) | API Thickening Time Schedule | Thickening Time (HR:MIN) | 7 Day Compressive Strength @ 220° F. |
|---|---|---|---|---|---|
| 1 | 0.2 | — | 17 | — | 680 |
| 2 | 0.2 | 186 | 17 | Gelled | — |
| 3 | 0.2 | — | 17 | Gelled | — |
| 4 | 0.1 | 186 | 17 | +17:45 | 1390 |
| 5 | 0.05 | 186 | 17 | Gelled @ ±3:00 | — |
| 6[5] | 0.1 | — | — | Mixed Thick | 1835 |
| 7 | 0.1 | 186 | 17 | +17:00 | 1524 |
| 8 | 0.05 | 186 | 17 | +8:00 | — |
| 9 | 0.05 | 236 | 19 | 3:00 | — |
| 10 | 0.13[7] | 236 | 19 | 1:20 | — |
| 11 | 0.03 | 186 | 17 | 3:57 | 2865 |
| 12 | 0.08[8] | 186 | 17 | 2:42 | — |
| 13 | 0.2 | 284 | 21 | +5:40 | — |
| 14 | 0.1 | 284 | 21 | 6:00 | 1822 |
| 15 | 0.03 | — | — | — | 2430 |
| 16 | 0.1 | 284 | 21 | 3:30 | 2890 |

TABLE XII-continued

Cement Composition Properties and Performance Data

| 17 | 0.15 | 301 | 21 | +6:34 | — |
|----|------|-----|----|-------|---|
| 18 | — | 80 | — | +8:00 | 263[9] |
| 19 | — | 120 | 15 | 7:50 | — |
| 20 | — | 140 | 15 | 4:37 | — |
| 21 | — | 120 | 15 | 4:50 | — |
| 22 | — | 140 | 15 | 3:05 | 2820 |
| 23 | — | 160 | 15 | 1:38 | — |
| 24[6] | 0.04 | 200 | — | 4:11 | 1622[10] |

[1]Fine Particle Size Sand having particles of a size no greater than 20 microns.
[2]Condensation Polymer Product of Formaldehyde, Acetone and Sodium Sulfite.
[3]Copolymer of N,N-dimethylacrylamide and 2-acrylamido-2-methyl propane sulfonic acid.
[4]Aminotri(methylene phosphonic acid).
[5]Contained fumed silica in an amount of 40% by weight of cement.
[6]Contained a styrene-butadiene copolymer latex emulsion in an amount of 66% by weight of cement and an anionic surfactant in an amount of about 35% by weight of cement.
[7]Contained a modified sodium lignosulfonate set retarding additive.
[8]Contained a set retarding additive comprised of a blend of calcium lignosulfonate and gluconic acid.
[9]24 hour compressive strength at 80° F.
[10]72 hour compressive strength at 200° F.

From Table XII it can be seen that the cement compositions of this invention do not prematurely gel and develop excellent compressive strengths.

EXAMPLE 2

Additional fine particle size cement compositions were prepared and tested for rheology and thickening times. A first group of test slurries were prepared (Slurry Nos. 25–28) containing fine particle size Portland cement wherein the particles of the cement were of a size no greater than about 30 microns and an equal amount by weight of fine particle size ASTM Class C fly ash wherein the particles were of a size no greater than about 30 microns. Water was included in these compositions in quantities required to produce composition densities of 12 pounds per gallon. In addition, the compositions included 0.3 gallons per 50 pound sack of aminotri(methylenephosphonic acid) set retarding additive, 0.05 gallons per 50 pound sack of cement of a defoamer and 0.5% by weight of cement of a dispersing agent comprised of the condensation polymer product of formaldehyde, acetone and sodium sulfite.

A second group of test slurries were prepared (Slurry Nos. 29–33) which were identical to slurries 25–28 except that instead of Class C fly ash, fine particle size ASTM Class F fly ash wherein the particles were of a size no greater than about 30 microns was utilized.

A third group of test slurries were prepared (Slurry Nos. 34–37) which were identical to the first and second groups of slurries except that instead of equal amounts of fine particle size cement and fine particle size fly ash, the slurries included only fine particle size cement in an amount equal to the total amount of cement and fly ash used in the other slurties.

The oxide analysis of the Class F and Class C fine particle size fly ashes utilized in the test cement slurries as well as the ASTM requirements for Class F and Class C fly ashes are set forth in Table XIII below.

TABLE XIII

Oxide Analysis of Class F and C Fine Particle Size Fly Ashes

| Oxide | Class F Fly Ash | Class F Requirements[7] | Class C Fly Ash | Class C Requirements[7] |
|-------|-----------------|-------------------------|-----------------|-------------------------|
| $Na_2O$[1] | 0.10 | Maximum of 1.5% | 1.32 | — |
| MgO[1] | 1.07 | — | 5.93 | — |
| $Al_2O_3$ | 26.89 | Total Minimum of 70% | 16.35 | Total Minimum of 5% |
| $SiO_2$ | 52.90 | | 33.00 | |
| $SO_3$[2] | 1.43 | Maximum of 5% | 3.15 | Maximum of 5% |
| $K_2O$ | 1.13 | — | 0.34 | — |
| CaO | 9.24 | — | 29.66 | — |
| $TiO_2$ | 1.42 | — | 1.32 | — |
| MnO | 0.05 | — | 0.04 | — |
| $Fe_2O_3$ | 3.72 | — | 7.04 | — |
| SrO | 0.14 | — | 0.48 | — |
| BaO | 0.10 | — | 0.99 | — |
| Limiting Oxygen Index (LOI)[3] | 1.81 | Maximum of 6%[8] | 0.39 | Maximum of 6% |
| % Moisture[4] | 0.29 | Maximum of 3% | N/A | Maximum of 3% |
| % Water Soluble Alkali (WSA)[5] | 0.103 | — | 1.67 | — |
| % Free Lime | 0. | — | 0.53 | — |
| % Borate[6] | 0.8 | — | N/A | — |

[1]Na & Mg analysis by atomic absorption.
[2]S analysis by sulfur analyzer.
[3]LOI by weight loss at 1000° C.
[4]% moisture by weight loss at 110° C.
[5]WSA results by ICP.
[6]By absorbance.
[7]ASTM C618; 1991 Annual Book of ASTM Standards, Volume 04.02, Concrete and Aggregates.
[8]The use of Class F pozzolan containing up to 12% LOI may be approved by the user if either acceptable performance records or laboratory test results are made available.

The results of the rheology and thickening time tests using the various slurries described above are set forth in Table XIV below.

TABLE XIV

Rheology and Thickening Time Date

| Slurry | Temperature °F. | Fann[1] Data @ indicated rpm's | | | | | | CEMFLO DATA[2] | | Time[3] to 70 Bc @ 186° F. (HR:MIN) |
|---|---|---|---|---|---|---|---|---|---|---|
| | | 300 | 200 | 100 | 6 | 3 | 600 | PV (cp) | YP (lb/100 ft²) | |
| 25 | 80 | 25 | 21 | 16 | 8 | 7 | 38 | 13.6 | 12.4 | 0:33 |
| 26 | 120 | 41 | 36 | 28 | 13 | 11 | 58 | 19.8 | 23.2 | — |
| 27 | 140 | 193 | 154 | 117 | 36 | 31 | 250 | 113.6 | 84.0 | — |
| 28 | 160 | 175 | 145 | 112 | 35 | 37 | 204 | 94.7 | 86.1 | — |
| 29 | 80 | 40 | 34 | 26 | 12 | 10 | 55 | 21.2 | 20.5 | 4:27 |
| 30 | 120 | 42 | 37 | 29 | 16 | 13 | 57 | 19.7 | 24.3 | — |
| 31 | 140 | 37 | 32 | 26 | 14 | 11 | 49 | 16.6 | 22.0 | — |
| 32 | 160 | 35 | 30 | 24 | 13 | 10 | 47 | 16.6 | 19.8 | — |
| 33 | 180 | 37 | 33 | 26 | 15 | 10 | 45 | 16.7 | 22.2 | — |
| 34 | 80 | 142 | 127 | 103 | 37 | 27 | 175 | 59.1 | 90.1 | No Time[4] |
| 35 | 120 | 154 | 137 | 115 | 36 | 22 | 187 | 58.8 | 102.4 | — |
| 36 | 140 | 148 | 129 | 105 | 35 | 25 | 184 | 64.9 | 89.6 | — |
| 37 | 160 | Slurry Gelled set soon after reaching 160° F. | | | | | | | | |

[1]Fann Model 35 Viscometer.
[2]CEMFLO data calculated using 300, 200 and 100 rpm data points.
[3]API Schedule 17, 2.7° F. to 186° F. @ 9000 psi.
[4]Test not run; unable to get slurry to pump above 160° F.

From Table XIII it can be seen that the Class C fly ash contains a high content of calcium hydroxide in the form of free lime and calcium oxide as determined by Standard Analytical Oxide Analysis Methods. The fine particle size Class F fly ash utilized in accordance with the present invention contains a much lower amount of calcium hydroxide. From Table XIV it can be seen that the test cement slurries containing fine particle size Class C fly ash (Slurry Nos. 25–28) and the test slurries containing 100% fine particle size Portland cement only (Slurry Nos. 34–37) both exhibit severe gelation tendencies. The slurries of the present invention including fine particle size Class F fly ash (Slurry Nos. 29–33), on the other hand, do not exhibit such gelation tendencies.

Thus, the present invention is well adapted to carry out the objects and attain the ends and advantages mentioned as well as those which are inherent therein. While numerous changes to the invention may be made by those skilled in the art, such changes are encompassed within the spirit of this invention as defined by the appended claims.

What is claimed is:

1. A method of cementing in a subterranean zone penetrated by a well bore comprising the steps of:
    pumping a fine particle size cement composition into said zone, said cement composition comprising:
    a fine particle size hydraulic cement wherein the particles are of a size no greater than about 30 microns and have a Blaine Fineness no less than about 6000 square centimeters per gram;
    a fine particle size pozzolanic material characterized by a low calcium hydroxide content whereby it does not chemically react at ordinary temperatures in the presence of water to form a cementitious compound without the addition of calcium hydroxide thereto and which in the presence of water combines with calcium hydroxide released by the hydration of said hydraulic cement wherein the particles are of a size no greater than about 30 microns and have a Blaine Fineness no less than about 5,000 square centimeters per gram, said pozzolanic material being present in said composition in an amount in the range of from about 20% to about 90% by weight of cement therein;
    sufficient water to form a pumpable slurry; and
    allowing said cement composition to set into a hard substantially impermeable mass in said zone.

2. The method of claim 1 wherein said fine particle size cement composition further comprises a fluid loss control additive.

3. The method of claim 2 wherein said fluid loss control additive is selected from the group consisting of hydroxyethylcellulose, carboxymethylhydroxyethylcellulose, copolymers of N,N-dimethylacrylamide and 2-acrylamido-2-methyl propane sulfonic acid and copolymers of acrylamide and 2-acrylamido-2-methyl propane sulfonic acid, said fluid loss control agent being present in said composition in an amount up to about 3% by weight of cement therein.

4. The method of claim 1 wherein said fine particle size cement composition further comprises a set retarding additive.

5. The method of claim 4 wherein said set retarding additive is selected from the group consisting of aminotri(methylenephosphonic acid), diethylenetriaminepenta(methylenephosphonic acid), ethylenediaminetetra(methylenephosphonic acid), hexamethylenediaminetetra(methylenephosphonic acid) and 1-hydroxyethylidene-1, 1-diphosphonic acid, said set retarding additive being present in said composition in an amount up to about 2% by weight of cement therein.

6. The method of claim 1 wherein said fine particle size cement composition further comprises a fine particle size sand wherein the particles are of a size no greater than about 25 microns, said fine particle size sand being present in said composition in an amount in the range of from about 30% to about 60% by weight of cement therein.

7. The method of claim 1 wherein said fine particles size cement composition further comprises a dispersing agent comprised of the condensation polymer product of formaldehyde, acetone and sodium sulfite, said dispersing agent being present in said composition in an amount up to about 3% by weight of cement therein.

8. The method of claim 1 wherein the particles of said fine particle size pozzolanic material are of a size no longer than about 15 microns.

9. The method of claim 1 wherein the particles of said fine particle size pozzolanic material are of a size no larger than about 10 microns.

10. The method of claim 1 wherein about 90% of the particles of said fine particle size pozzolanic material have diameters no greater than about 12 microns, 50% of the particles have diameters no greater than about 6 microns and 20% of the particles have diameters no greater than about 3 microns.

11. The method of claim 1 wherein the particles of said fine particle size pozzolanic material have a Blaine Fineness no less than about 12,000 square centimeters per gram.

12. A method of cementing in a subterranean zone penetrated by a well bore comprising the steps of:
   pumping a fine particle size cement composition into said zone, said cement composition comprising:
      a fine particle size hydraulic cement wherein the particles are of a size no greater than about 30 microns and have a Blaine Fineness no less than about 6000 square centimeters per gram;
      a fine particle size pozzolanic material which in the presence of water combines with calcium hydroxide released by the hydration of said hydraulic cement wherein the particles are of a size no greater than about 30 microns and have a Blaine Fineness no less than about 5,000 square centimeters per gram, said pozzolanic material being ASTM Class F fine particle size fly ash and present in said composition in an amount in the range of from about 20% to about 90% by weight of cement therein;
   sufficient water to form a pumpable slurry; and
   allowing said cement composition to set into a hard substantially impermeable mass in said zone.

13. The method of claim 12 wherein said fine particle size cement composition further comprises a dispersing agent comprised of the condensation polymer product of formaldehyde, acetone and sodium sulfite, said dispersing agent being present in said composition in an amount up to about 3% by weight of cement therein.

14. The method of claim 12 wherein said ASTM Class F fine particle size fly ash is present in said composition in an amount in the range of from about 30% to about 80% by weight of cement therein.

15. The method of claim 14 wherein said ASTM Class F fine particle size fly ash is present in said composition in an amount of about 50% by weight of cement therein.

* * * * *